(12) United States Patent
Williams et al.

(10) Patent No.: US 6,838,523 B2
(45) Date of Patent: Jan. 4, 2005

(54) COMPOSITION FOR MOLDING THIN-WALLED PARTS, AND INJECTION-MOLDED SQUEEZE TUBE MADE THEREOF

(75) Inventors: Alan D. Williams, Camden, SC (US); James Stevens, Castleton, NY (US); Jeremy Morin, Florence, SC (US)

(73) Assignee: Sonoco Development, Inc., Hartsville, SC (US)

( * ) Notice: Subject to any disclaimer, the term of this patent is extended or adjusted under 35 U.S.C. 154(b) by 0 days.

(21) Appl. No.: 10/285,261

(22) Filed: Oct. 31, 2002

(65) Prior Publication Data

US 2004/0087723 A1 May 6, 2004

(51) Int. Cl.$^7$ .......................... C08L 23/00; C08L 23/04
(52) U.S. Cl. ..................................... 525/240
(58) Field of Search ........................ 525/240

(56) References Cited

U.S. PATENT DOCUMENTS

| | | | | |
|---|---|---|---|---|
| 4,359,553 A | * | 11/1982 | Edwards | 525/240 |
| 4,378,451 A | * | 3/1983 | Edwards | 525/240 |
| 5,041,491 A | * | 8/1991 | Turke et al. | 524/425 |
| 5,516,563 A | * | 5/1996 | Schumann et al. | 428/34.2 |
| 6,124,008 A | | 9/2000 | Barre | |
| 6,159,566 A | | 12/2000 | Barre | |
| 6,407,171 B1 | | 6/2002 | Agarwal et al. | |

FOREIGN PATENT DOCUMENTS

EP 0 530 782 A1 3/1993

OTHER PUBLICATIONS

European Search Report for European Application No. 0300727.8, filed Mar. 28, 2003; Date completed Feb. 27, 2004; Date Mailed Mar. 9, 2004.

* cited by examiner

Primary Examiner—Nathan M. Nutter
(74) Attorney, Agent, or Firm—Alston & Bird LLP

(57) ABSTRACT

Compositions for injection-molding of long, thin-walled, one-piece squeeze tubes include low-density polyethylene having a density less than about 0.925 g/cc and a melt index of at least about 50 g/10 minutes, and polypropylene having a high melt index greater than about 800 g/10 minutes, wherein the high melt index is attained by peroxide degradation of the polypropylene during melt processing. The compositions can also include a polymer that is miscible and compatible with low-density polyethylene and polypropylene for enhancing flow of the molding composition in the mold, the polymer having a glass transition temperature $T_g$ of about −20 to −40° C., and/or metallocene resin having a density less than about 0.915 g/cc.

33 Claims, 1 Drawing Sheet

Figure 1:
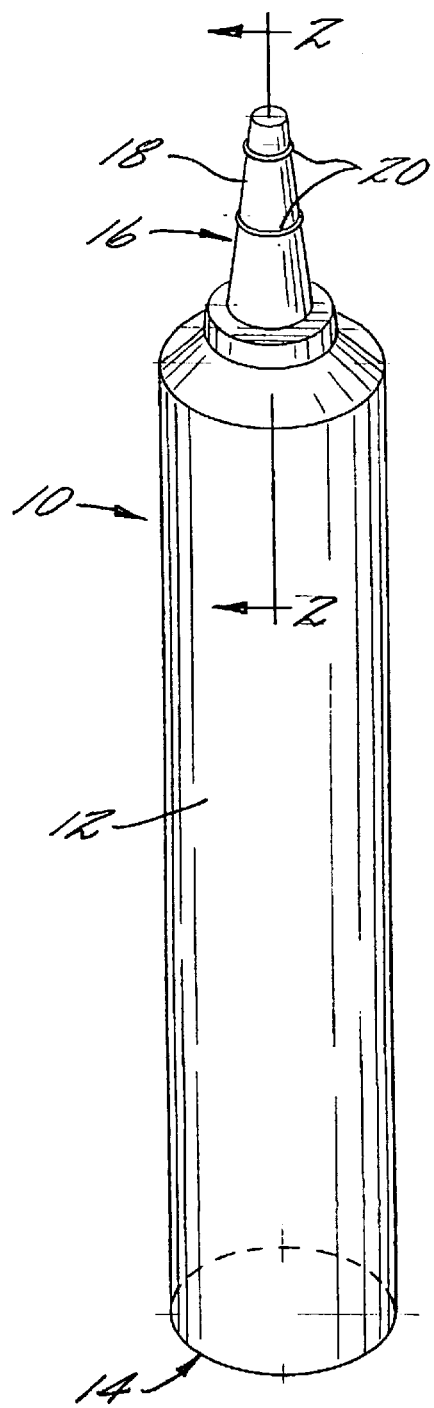

COMPOSITION FOR MOLDING THIN-WALLED PARTS, AND INJECTION-MOLDED SQUEEZE TUBE MADE THEREOF

FIELD OF THE INVENTION

The invention relates to polymer compositions for molding thin-walled parts, and particularly for injection-molding such parts. The invention also relates to squeeze tubes made by injection molding.

BACKGROUND OF THE INVENTION

Squeeze tubes made of thermoplastic are commonly used for containing and dispensing various substances from caulk to food products to health and beauty aids. The majority of squeeze tubes currently on the market are made by injection-molding the head portion of the tube that defines the nozzle or orifice from which the contents will be dispensed, separately extruding the tubular body portion of the tube, and then joining the head and body portions together by a suitable process such as fusion bonding or welding. For economic and other reasons, it would be advantageous to injection-mold the entire tube as a one-piece integral part.

Injection-molding of squeeze tubes, however, poses a number of challenges. The tube must be soft and pliable so that it can readily be compressed by hand to dispense the contents, and hence the wall of the tube must be relatively thin and the modulus of the thermoplastic material must be relatively low. The thin wall, coupled with the substantial length required of some types of squeeze tubes, can result in a large length-to-thickness ratio for the tube (for example, greater than 250, or even greater than 400). The large length-to-thickness ratio makes molding difficult because the molding composition is resistant to being forced through the long, thin mold passage; high injection pressures must be used, and the molding composition must have a low viscosity. Even with a low-viscosity molding composition, the requisite high injection pressure can cause the core of the mold to deflect to one side, particularly if the core is supported at only one end as is the case when molding a tube to have a closed head end. Such core deflections, if large enough, can lead to unacceptably high wall thickness variations in the finished tube.

Polyolefins such as low-density polyethylenes are available that are soft enough to make a readily compressible squeeze tube, but the tube must also be resistant to cracking when compressed. Polyethylene is prone to environmental stress cracking when exposed to certain types of substances, particularly many health and beauty products, and hence cannot be used as the sole ingredient in a molding composition for squeeze tubes that are to contain such products. Tear-resistance is also an important requirement for a squeeze tube.

U.S. Pat. No. 6,124,008 describes a composition for injection-molding of squeeze tubes that is said to substantially improve the environmental stress-crack resistance (ESCR) of the tubes. The composition comprises a first ethylene/$C_4$ to $C_5$ olefin copolymer such as linear low-density ethylene/butene copolymer, blended with a second ethylene/$C_6$ to $C_{10}$ olefin copolymer such as linear low-density ethylene/octene copolymer. The melt index (MI) of the first component is given as about 10 to 20 g/10 minutes, and the MI of the second component is given as about 4 to 8 g/10 minutes. It is believed such a composition would not be suitable for injection-molding of squeeze tubes having a very high length-to-thickness ratio (e.g., greater than 250) and a substantially uniform wall thickness (e.g., uniform to within ±0.005 inch) around the circumference and along the length of the tube, particularly in the case of closed-end tubes molded with the mold core supported at only one end, where the core is especially susceptible to being deflected by the high injection pressures required.

SUMMARY OF THE INVENTION

The present invention was developed particularly to address the demanding requirements and constraints associated with injection-molding of squeeze tubes, and especially closed-end squeeze tubes, having a high length-to-thickness ratio (greater than 250). Some embodiments of the invention are suitable for containing health and beauty products that tend to cause environmental stress cracking.

Although the invention resulted from efforts to solve the particularly problems attendant with injection-molding of high length-to-thickness ratio, closed-end squeeze tubes for stress-crack-inducing substances, at least some embodiments of the invention can also be applied to injection-molding of squeeze tubes that are not closed-ended and/or have a length-to-thickness ratio less than 250; the invention can also be applied to squeeze tubes that are not intended to contain stress-cracking-inducing substances.

In accordance with the invention, a molding composition for injection-molding of flexible thin-walled parts such as squeeze tubes comprises a blend of multiple polymer components selected such that the resulting composition has a high melt index for ease of flow in the mold and such that the composition yields a part having a relatively low modulus of elasticity (less than 50,000 psi, more preferably less than 40,000 psi, and still more preferably less than 30,000 psi) and having adequate tear strength (at least about 45 lb/in, more preferably at least about 65 lb/in). In one embodiment, the composition comprises about 65 to 95 weight percent low-density polyethylene having a density less than about 0.925 g/cc and a melt index of at least about 50 g/10 minutes, and about 5 to 35 weight percent polypropylene having a high melt index greater than about 800 g/10 minutes, the high melt index of the polypropylene being attained by peroxide degradation of the polypropylene during melt processing. The low-density polyethylene advantageously has a density less than 0.92 g/cc and a melt index of at least about 65 g/10 minutes. The polypropylene advantageously has a melt index exceeding 1000 g/10 minutes, and desirably has a melt index of about 1200 to 1500 g/10 minutes. In a preferred embodiment, the low-density polyethylene component comprises about 80 weight percent and the polypropylene component comprises about 20 weight percent of the composition. The composition has a low viscosity such that it flows relatively easily during injection-molding. The low-density polyethylene component imparts softness and flexibility to a molded part. The polypropylene component enhances the environmental stress-crack resistance of the part.

Advantageously, the above-described composition can further comprise a metallocene resin having a density less than about 0.915 g/cc to enhance tear-resistance of a molded part. The composition comprises about 50 to 80 weight percent of the low-density polyethylene, about 5 to 35 percent of the polypropylene, and about 5 to 30 percent of the metallocene resin. A preferred embodiment comprises about 55 to 60 percent of the low-density polyethylene, about 20 to 30 percent of the polypropylene, and about 10 to 25 percent of the metallocene. Any of the metallocene resins known generally as polyolefin plastomers (POP) having a density less than about 0.915 g/cc can be used.

In accordance with another embodiment of the invention, a composition for molding thin-walled parts comprises about 50 to 90 weight percent low-density polyethylene having a density less than about 0.925 g/cc and a melt index of at least about 50 g/10 minutes, about 5 to 35 weight percent polypropylene having a high melt index greater than about 800 g/10 minutes, the high melt index being attained by peroxide degradation of the polypropylene, and about 5 to 15 weight percent of a low molecular weight, low glass transition temperature ($T_g$) polymer that is miscible and compatible with low-density polyethylene and polypropylene for enhancing flow of the molding composition in the mold. The $T_g$ of the flow-enhancing polymer advantageously is from about −20 to −40° C., more preferably about −25 to −35° C., still more preferably about −30° C. Advantageously, the flow-enhancing resin can comprise ethylene-propylene rubber.

To enhance the tear-resistance of a molded part, the composition in still another embodiment of the invention comprises about 45 to 80 weight percent low-density polyethylene having a density less than about 0.925 g/cc and a melt index of at least about 50 g/10 minutes, about 10 to 30 weight percent polypropylene having a high melt index greater than about 800 g/10 minutes, the high melt index being attained by peroxide degradation of the polypropylene, about 5 to 15 weight percent ethylene-propylene rubber, and about 5 to 15 weight percent metallocene resin having a density less than about 0.915 g/cc. The metallocene resin has been found to significantly enhance the tear-resistance of thin-walled injection-molded parts. In a preferred embodiment, the composition comprises about 55 weight percent of the low-density polyethylene component, about 25 weight percent of the polypropylene component, about 10 weight percent of the ethylene-propylene rubber component, and about 10 weight percent of the metallocene resin.

Any of the composition in accordance with the invention can also include other additives such as pigments or colorants, slip-enhancing agents, or other ingredients for imparting certain desired properties.

The invention also encompasses one-piece injection-molded squeeze tubes formed of the above-described compositions.

BRIEF DESCRIPTION OF THE SEVERAL VIEWS OF THE DRAWING(S)

Figure 2:
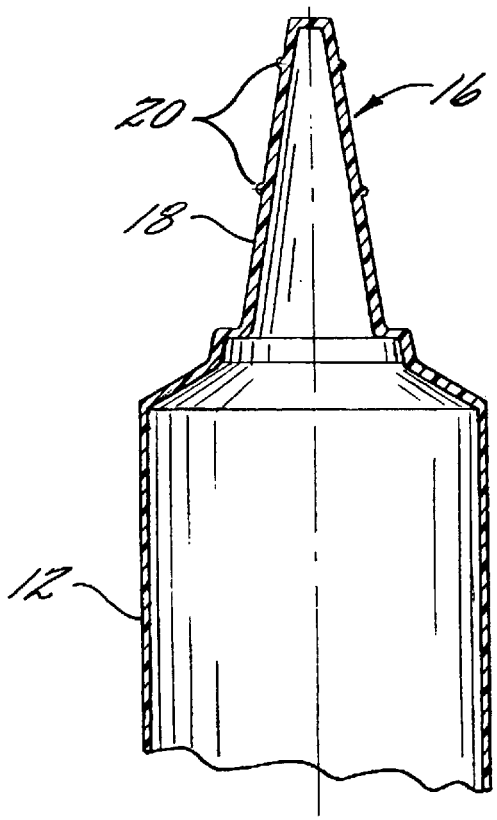

Having thus described the invention in general terms, reference will now be made to the accompanying drawings, which are not necessarily drawn to scale, and wherein:

FIG. 1 shows an injection-molded squeeze tube in accordance with one embodiment of the invention; and FIG. 2 is a cross-sectional view of the squeeze tube taken on line 2—2 of FIG. 1.

DETAILED DESCRIPTION OF THE INVENTION

The present invention now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIG. 1 shows an injection-molded squeeze tube 10 in accordance with one embodiment of the invention, depicted in the state in which the tube is ejected from the molding apparatus. FIG. 2 shows an axial cross-sectional view of the tube. The tube includes a tubular body portion 12 that is open at one end 14. The tube further includes a head portion 16 joined to the opposite end of the body portion 12. The head portion 16 in the illustrated embodiment defines a generally conical hollow tip or nozzle 18 through which contents of the squeeze tube can be dispensed. The tube would be filled through the open end 14, and then the open end would be sealed closed in any suitable fashion. The end of the nozzle 18 is closed in the illustrated embodiment; an end portion of the nozzle would be cut off to enable the contents to be dispensed. The nozzle 18 is molded to have at least one ring-shaped ridge 20 for engaging a snap-fit cap (not shown) to re-close the tube after use. The invention is not limited to squeeze tubes of the type shown in FIGS. 1 and 2. Thus, a squeeze tube in accordance with the invention could include a head portion that defines external threads for engaging a screw-on cap, or that has other features for engaging other types of closures; additionally or alternatively, the head portion could be molded to include an opening therein.

Squeeze tubes generally must have relatively thin walls to be pliable enough to be readily compressed by hand. Thus, the wall thickness generally should be no more than about 0.040 inch (about 1 mm), and preferably should be from about 0.015 to about 0.035 inch (about 0.35 to 0.9 mm). For some types of products, the length of the squeeze tube must be relatively long; for example, caulk is typically packaged in squeeze tubes that are up to about 10 inches in length. Accordingly, the resulting length-to-wall thickness ratio can become quite high. When injection-molding squeeze tubes having a length-to-wall thickness ratio greater than 250, it becomes difficult with existing molding compositions to achieve proper flow of the molding composition so that the composition fully fills out all areas of the mold.

Further complicating the injection-molding operation, a closed-end squeeze tube such as the tube 10 shown in FIGS. 1 and 2 must be molded in an injection-molding apparatus in which the core of the mold (i.e., the part that defines the contour of the inner surfaces of the body portion and head portion of the squeeze tube) is supported at only one end; in particular, the core is supported at the end corresponding to the open end 14 of the squeeze tube, but the opposite end cannot be supported because the head portion 16 is closed. The core thus is supported in cantilever fashion, and hence is more-susceptible to deflecting as a result of injection pressure relative to a core supported at both ends.

Additionally, as noted, the finished tube desirably should be soft and pliable, should not be prone to cracking when pressed flat, and should have adequate resistance to tearing. For tubes that will contain known stress-crack-inducing substances, the tubes should not be prone to environmental stress-cracking when filled with such substances.

In general, to facilitate flow of the molding composition in the mold, particularly at length-to-thickness ratios greater than 250, the molding composition should have a low viscosity, and hence a low molecular weight. However, compositions with low molecular weight tend to have poor stress-crack resistance.

The molding compositions and squeeze tubes of the present invention enable these competing requirements and constraints to be met. The compositions are particularly suitable for injection-molding of tubes with length-to-thickness ratios greater than 250 and with highly uniform wall thickness, even when molded with a cantilever-supported mold core.

A first series of trials was conducted using various compositions to injection-mold squeeze tubes substantially as shown in FIGS. 1 and 2. The tubes had a length of 9.5 inches (about 240 mm), and the diameter of the tubular body portion of each tube averaged about 1.5 inches (about 38 mm); the body portion had a slight taper from the open end toward the head portion to facilitate air-ejection of the tube from the mold core. The various compositions used are set forth in Table I below. All percentages are based on weight and are approximate.

TABLE I

Molding Compositions Tested in First Series

| Component | A | B | C | D | E | F | G | H | I | J | K | L |
|---|---|---|---|---|---|---|---|---|---|---|---|---|
| LDPE 509 | 75% | 75% | 65% | 75% | 65% | 60% | 55% | 60% | 55% | 75% | 75% | 75% |
| PP 3546G | 15% | 15% | 15% | 15% | 20% | 20% | 20% | 20% | 25% | 15% | 15% | 15% |
| ENGAGE ® 8407 metallocene | 10% | 10% | 10% | 5% | 15% | 20% | 25% | 10% | 10% | | | |
| VESTOPLAST ® 703 ethylene propylene rubber | | | 10% | 5% | | | | 10% | 10% | | | |
| EXACT 2M101 metallocene | | | | | | | | | | 10% | | |
| EXACT 0230 metallocene | | | | | | | | | | | 10% | |
| AFFINITY EG8185 metallocene | | | | | | | | | | | | 10% |

The LDPE 509 from ExxonMobil is a low-density polyethylene homopolymer having a melt index of 70 g/10 minutes and a density of 0.913 g/cc. The polypropylene 3546G from ExxonMobil has a density of 0.90 g/cc and a melt index of 1200 g/10 minutes; peroxide is added to control the polymer rheology during melt processing. The peroxide causes degradation of the polypropylene during melt processing such that a very high melt index is achieved. The typical application of the 3546G polypropylene is in production of melt blown nonwoven fabrics.

ENGAGE® 8407 from DuPont Dow Elastomers is a metallocene plastomer having a melt index of 30 g/10 minutes and a density of 0.870 g/cc. VESTOPLAST® 703 from DeGussa AG of Marl, Germany, is a low molecular-weight ($M_n$=7,300 g/mol, $M_w$=34,000 g/mol) amorphous terpolymer of ethylene, propylene and 1-butene having a density of 0.87 g/cc and a melt viscosity at 190° C. of 2,700±700 mPa-s, and having a glass transition temperature $T_g$ of –28° C. The VESTOPLAST® is also referred to herein as ethylene-propylene rubber (EPR). VESTOPLAST® is typically used as a hot-melt adhesive for nonwoven and hygienic applications, paper and packaging, woodworking, textile applications, pre-shaped automobile carpets, and other adhesive uses. EXACT 2M101 is a metallocene plastomer having a melt index of 30 g/10 minutes and a density of 0.88 g/cc. EXACT 0230 is a metallocene plastomer having a melt index of 30 g/10 minutes and a density of 0.902 g/cc. AFFINITY EG8185 is a metallocene plastomer having a melt index of 30 g/10 minutes and a density of 0.885 g/cc.

The various compositions were injected into the mold at a temperature of 575 to 600° F. at an injection pressure of about 7,000 psi, with the mold at a temperature of about 75° F. The mold defined a nominal wall thickness of the tube of about 0.035 inch near the head portion of the tube, tapering to about 0.030 inch at the open end of the tube. Sample tubes for each composition were measured to determine the minimum wall thickness at the thinnest part of the tube. Additionally, modulus, tear strength, and stress-crack resistance were measured for most of the samples. Table II below shows the results of these tests:

TABLE II

Test Results of First Series

| Sample | Min. Wall Thickness (in.) | Stress Crack Resistance (hrs.) | Modulus (psi) | Tear Strength (lb./in.) |
|---|---|---|---|---|
| A | 0.026 | <1 | 30,000 | 64 |
| B | 0.026 | <1 | N.D. | 72 |
| C | 0.033 | <1 | 18,400 | 49 |
| D | 0.031 | <1 | 27,000 | 22 |
| E | 0.027 | <1 | N.D. | 79 |
| F | 0.027 | <115 | 36,000 | 70 |
| G | 0.027 | >1050* | 26,000 | 80 |
| H | 0.032 | <64 | 27,500 | 62 |
| I | 0.033 | <740 | 33,000 | 48 |
| J | 0.024 | <1 | N.D. | N.D. |
| K | 0.029 | <1 | 31,000 | N.D. |
| L | 0.027 | <1 | 28,000 | N.D. |

N.D. = not determined.
*The stress-cracking test of this specimen was still on-going at the time the present application was filed; as of the filing, the specimen had accumulated a total time without stress cracking as indicated in the table.

The modulus of the tube should not exceed about 50,000 psi, more preferably should not exceed about 40,000 psi, and most preferably should not exceed about 30,000 psi. Tear strength should be at least about 45 lb/in., and more preferably at least about 65 lb/in. Ideally, the tube should not stress crack at all. The minimum wall thickness preferably should not deviate more than 0.005 inch from nominal; the minimum wall thickness tended to occur near the head end of the tube, where the intended nominal thickness was about 0.034 inch.

The results in Table II indicate that the compositions C, D, H, I, and K yielded tubes whose minimum wall thickness did not deviate more than 0.005 inch from nominal. However, compositions C, D, H, and K had very poor stress-crack resistance; composition D also had poor tear strength. Composition I achieved a considerably better stress-crack resistance than the others (although still less than desired), the tear strength was adequate, and the modulus was sufficiently low to produce a desirably soft tube. Composition G achieved the best stress-crack resistance of all those tested; it also achieved the greatest tear strength of the compositions tested, and had a low modulus for softness. Although the wall thickness deviated about 0.007 inch from nominal, it was confirmed in subsequent tests that using a mold core of a very high-modulus steel can substantially reduce the core deflection and hence the wall thickness deviation. Thus, while wall thickness deviation is an important parameter, it can be brought within acceptable limits by using the high-modulus mold core. Taking all factors into account, composition G achieved the best results for a tube requiring good stress-crack resistance.

For squeeze tubes containing substances that do not induce environmental stress cracking, stress-crack resistance is not a particularly important parameter. In such cases, compositions C, H, I, and K may yield acceptable tubes without a high-modulus core; using a high-modulus core, it is believed compositions A, B, C, E, F, G, H, I, K, and L should yield tubes having adequate tear strength and sufficiently low modulus.

A second series of trials was conducted to further investigate the effect of composition on tube properties and mold core deflection. The molding compositions that were tested are listed in Table III below:

TABLE III

Molding Compositions Tested in Second Series

| Component | A' | B' | C' | D' | E' | F' |
|---|---|---|---|---|---|---|
| LDPE 509 | 27.5% | 55% | 55% |  | 60% | 55% |
| Voridian LDPE 812A | 27.5% |  |  | 55% |  |  |
| PP 3546G | 25% | 25% | 25% | 25% | 30% | 25% |
| ENGAGE ® 8409 metallocene | 10% | 10% | 10% | 10% | 10% | 10% |
| VESTOPLAST ® 703 ethylene propylene rubber | 10% | 10% | 10% | 10% |  | 10% |

The Voridian 812A LDPE from Eastman Chemical Company has a melt index of 200 g/10 minutes and a density of 0.909 g/cc.

All compositions except B' were molded with a high-modulus mold core base and high-modulus mold core poppet, obtained from Smart Mould International Ltd. LLC of Traverse City, Mich.; the material of the high-modulus core components is said to have a Young's modulus of about 89,000 ksi (more than three times that of conventional steel mold cores). Composition B' was molded with a much lower-modulus Be—Cu poppet mounted on the high-modulus mold core base. Results of the tests are given in Table IV below:

TABLE IV

Test Results of Second Series

| Sample | Stress Crack Resistance (hrs) | Modulus (psi) | Tear Strength (lb/in) | Core Deflection (in) |
|---|---|---|---|---|
| A' | <4 | 33,000 | 68 | 0.00159 |
| B' | >50* | 32,000 | 75 | 0.00325 |
| C' | >50* | 26,000 | 61 | 0.00103 |
| D' | >50* | 33,800 | 78 | 0.00124 |
| E' | >50* | 37,700 | 63 | 0.00178 |
| F' | >50* | 24,700 | 53 | 0.00165 |

*The stress-cracking test of this specimen was still on-going at the time the present application was filed; as of the filing, the specimen had accumulated a total time without stress cracking as indicated in the table.

All of the compositions achieved acceptable modulus and tear strength. With the use of the high-modulus mold core base and poppet, core deflections were maintained less than 0.002 inch, leading to tubes with highly uniform wall thickness. Even the test configuration employing the low-modulus poppet (composition B') achieved a relatively low core deflection.

Based on the above test series, it is believed a suitable injection-molding composition for some applications can comprises from about 65 to about 95 weight percent LDPE having a density less than about 0.925 g/cc (more preferably less than about 0.92 g/cc) and a melt index of at least about 50 g/10 minutes (more preferably at least about 65 g/10 minutes), and about 5 to 35 weight percent polypropylene having a high melt index greater than about 800 g/10 minutes (more preferably at least about 1000 g/10 minutes, and still more preferably about 1200 to 1500 g/10 minutes), wherein the high melt index is attained by peroxide degradation of the polypropylene during melt processing.

However, a more-preferred composition can further comprise a metallocene resin having a density less than about 0.915 g/cc to enhance tear-resistance of a molded part, wherein the composition comprises about 50 to 80 weight percent of the low-density polyethylene, about 5 to 35 percent of the polypropylene, and about 5 to 30 percent of the metallocene resin. The metallocene resin more preferably should have a density less than about 0.90 g/cc.

Another suitable composition for some applications can comprise about 50 to 90 weight percent low-density polyethylene having a density less than about 0.925 g/cc (more preferably less than about 0.92 g/cc) and a melt index of at least about 50 g/10 minutes (more preferably at least about 65 g/10 minutes) about 5 to 35 weight percent polypropylene having a high melt index greater than about 800 g/10 minutes (more preferably at least about 1000 g/10 minutes, and still more preferably about 1200 to 1500 g/10 minutes) attained by peroxide degradation of the polypropylene, and about 5 to 15 weight percent of a polymer having a glass transition temperature from about −20 to about −40° C. for enhancing flow of the composition in the mold. As noted, ethylene-propylene rubber exemplifies one suitable flow-enhancing polymer, but it is expected that other polymers (including single-monomer, comonomer, terpolymer, etc., and whether of block or random structure) having a glass transition temperature falling within this range would enhance flow of the composition during molding, although perhaps not as effectively as the ethylene-propylene rubber.

Still another molding composition suitable for injection-molding of squeeze tubes can comprise about 45 to 80 weight percent low-density polyethylene having a density less than about 0.925 g/cc (more preferably less than about 0.92 g/cc) and a melt index of at least about 50 g/10 minutes (more preferably at least about 65 g/10 minutes), about 10 to 30 weight percent polypropylene having a high melt index greater than about 800 g/10 minutes (more preferably at least about 1000 g/10 minutes, and still more preferably about 1200 to 1500 g/10 minutes) attained by peroxide degradation of the polypropylene, about 5 to 15 weight ethylene-propylene rubber, and about 5 to 15 weight percent metallocene resin having a density less than about 0.915 g/cc.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodi-

What is claimed is:

1. A composition for molding flexible thin-walled parts, comprising a blend of:
   about 65 to 95 weight percent low-density polyethylene having a density less than about 0.925 g/cc and a melt index of at least about 50 g/10 minutes; and
   about 5 to 35 weight percent polypropylene having a high melt index greater than about 800 g/10 minutes, said high melt index being attained by peroxide degradation of the polypropylene during melt processing.

2. The composition of claim 1, wherein the low-density polyethylene has a density less than about 0.920 g/cc.

3. The composition of claim 1, wherein the low-density polyethylene has a melt index of at least about 65 g/10 minutes.

4. The composition of claim 1, wherein the composition comprises about 80 weight percent of the low-density polyethylene and about 20 weight percent of the polypropylene.

5. The composition of claim 1, wherein the polypropylene has a melt index greater than 1000 g/10 minutes.

6. The composition of claim 1, wherein the polypropylene has a melt index of about 1200 to 1500 g/10 minutes.

7. The composition of claim 1, further comprising a metallocene resin having a density less than about 0.915 g/cc to enhance tear-resistance of a molded part, wherein the composition comprises about 50 to 80 weight percent of the low-density polyethylene, about 5 to 35 percent of the polypropylene, and about 5 to 30 percent of the metallocene resin.

8. A composition for molding flexible thin-walled parts, comprising a blend of:
   about 50 to 90 weight percent low-density polyethylene having a density less than about 0.925 g/cc and a melt index of at least about 50 g/10 minutes;
   about 5 to 35 weight percent polypropylene having a high melt index greater than about 800 g/10 minutes, said high melt index being attained by peroxide degradation of the polypropylene during melt processing; and
   about 5 to 15 weight percent of a flow-enhancing polymer that is miscible and compatible with low-density polyethylene and polypropylene for enhancing flow of the molding composition in the mold, the polymer having a glass transition temperature $T_g$ of about −20 to −40° C.

9. The composition of claim 8, wherein the flow-enhancing polymer comprises ethylene-propylene rubber.

10. The composition of claim 8, wherein the low-density polyethylene has a melt index of at least about 65 g/10 minutes.

11. The composition of claim 8, wherein the polypropylene has a melt index greater than 1000 g/10 minutes.

12. The composition of claim 8, wherein the polypropylene has a melt index of about 1200 to 1500 g/10 minutes.

13. The composition of claim 8, wherein the composition comprises about 70 weight percent of the low-density polyethylene, about 20 weight percent of the polypropylene, and about 10 weight percent of the flow-enhancing polymer.

14. A composition for molding flexible thin-walled parts, comprising a blend of:
   about 45 to 80 weight percent low-density polyethylene having a density less than about 0.925 g/cc and a melt index of at least about 50 g/10 minutes;
   about 10 to 30 weight percent polypropylene having a high melt index greater than about 800 g/10 minutes, said high melt index being attained by peroxide degradation of the polypropylene during melt processing;
   about 5 to 15 weight percent ethylene-propylene rubber; and
   about 5 to 15 weight percent metallocene resin having a density less than about 0.915 g/cc.

15. The composition of claim 14, wherein the low-density polyethylene has a density less than about 0.920 g/cc.

16. The composition of claim 14, wherein the low-density polyethylene has a melt index of at least about 65 g/10 minutes.

17. The composition of claim 14, wherein the polypropylene has a melt index greater than 1000 g/10 minutes.

18. The composition of claim 14, wherein the polypropylene has a melt index of about 1200 to 1500 g/10 minutes.

19. The composition of claim 14, wherein the composition comprises about 60 weight percent of the low-density polyethylene, about 20 weight percent of the polypropylene, about 10 weight percent of the ethylene-propylene rubber, and about 10 weight percent of the metallocene resin.

20. An injection-molded squeeze tube comprising a one-piece injection-molded structure having a tubular body portion and a head portion, said structure being formed of a composition comprising a blend of:
   about 65 to 95 weight percent low-density polyethylene having a density less than about 0.925 g/cc and a melt index of at least about 50 g/10 minutes; and
   about 5 to 35 weight percent polypropylene having a high melt index greater than about 800 g/10 minutes, said high melt index being attained by peroxide degradation of the polypropylene during melt processing.

21. The injection-molded squeeze tube of claim 20, wherein the tube has a length-to-wall thickness ratio greater than 250.

22. The injection-molded squeeze tube of claim 20, wherein the composition further comprises a metallocene resin having a density less than about 0.915 g/cc to enhance tear-resistance of the squeeze tube, wherein the composition comprises about 50 to 90 weight percent of the low-density polyethylene, about 5 to 35 percent of the polypropylene, and about 5 to 15 percent of the metallocene resin.

23. An injection-molded squeeze tube comprising a one-piece injection-molded structure having a tubular body portion and a head portion, said structure being formed of a composition comprising a blend of:
   about 50 to 90 weight percent low-density polyethylene having a density less than about 0.925 g/cc and a melt index of at least about 50 g/10 minutes;
   about 5 to 35 weight percent polypropylene having a high melt index greater than about 800 g/10 minutes, said high melt index being attained by peroxide degradation of the polypropylene during melt processing; and
   about 5 to 15 weight percent of a flow-enhancing polymer that is miscible and compatible with low-density polyethylene and polypropylene for enhancing flow of the molding composition in the mold, the polymer having a glass transition temperature $T_g$ of about −20 to −40° C.

24. The injection-molded squeeze tube of claim 23, wherein the tube has a length-to-wall thickness ratio greater than 250.

25. The injection-molded squeeze tube of claim 24, wherein the tube as molded has a closed end and an opposite open end.

26. An injection-molded squeeze tube comprising a one-piece injection-molded structure having a tubular body portion and a head portion, said structure being formed of a composition comprising a blend of:

about 45 to 80 weight percent low-density polyethylene having a density less than about 0.925 g/cc and a melt index of at least about 50 g/10 minutes;

about 10 to 30 weight percent polypropylene having a high melt index greater than about 800 g/10 minutes, said high melt index being attained by peroxide degradation of the polypropylene during melt processing;

about 5 to 15 weight percent ethylene-propylene rubber; and about 5 to 15 percent metallocene resin having a density less than about 0.915 g/cc.

27. The injection-molded squeeze tube of claim 26, wherein the tube has a length-to-wall thickness ratio greater than 250.

28. The injection-molded squeeze tube of claim 27, wherein the tube as molded has a closed end and an opposite open end.

29. The injection-molded squeeze tube of claim 26, wherein the low-density polyethylene has a density less than about 0.920 g/cc.

30. The injection-molded squeeze tube of claim 26, wherein the low-density polyethylene has a melt index of at least about 65 g/10 minutes.

31. The injection-molded squeeze tube of claim 26, wherein the polypropylene has a melt index greater than 1000 g/10 minutes.

32. The injection-molded squeeze tube of claim 26, wherein the polypropylene has a melt index of about 1200 to 1500 g/10 minutes.

33. The injection-molded squeeze tube of claim 26, wherein the composition comprises about 55 weight percent of the low-density polyethylene, about 25 weight percent of the polypropylene, about 10 weight percent of the ethylene-propylene rubber, and about 10 weight percent of the metallocene resin.

* * * * *